United States Patent [19]

Galuschak

[11] 3,962,797

[45] June 15, 1976

[54] SELF CONTAINED QUICK REACTING WIDE ANGLE GYROCOMPASSING

[75] Inventor: George Galuschak, Hasbrouck Heights, N.J.

[73] Assignee: The Singer Company, Little Falls, N.J.

[22] Filed: Oct. 17, 1974

[21] Appl. No.: 515,598

[52] U.S. Cl. ................................. 33/324; 33/318
[51] Int. Cl.² ..................................... G01C 19/38
[58] Field of Search ............ 33/323, 317, 318, 324, 33/326

[56] References Cited
UNITED STATES PATENTS

| | | | |
|---|---|---|---|
| 3,282,119 | 11/1966 | Shaw, Jr. et al. | 33/323 X |
| 3,404,571 | 10/1968 | Schlitt | 33/323 X |
| 3,725,691 | 4/1973 | Delaunay | 33/317 D |
| 3,813,788 | 6/1974 | Johnston | 33/323 |

Primary Examiner—William D. Martin, Jr.
Attorney, Agent, or Firm—Thomas W. Kennedy

[57] ABSTRACT

A self-contained gyrocompassing system providing switch means with coarse align and gyrocompass modes of operation. Starting in the coarse align mode, a north bubble sensor output along with an initial vertical error signal output is applied to an east torquer which coarsely levels the east gimbal. Subsequently, the switch means is placed in the gyrocompass mode and the signal from the north sensor is simultaneously applied to the east gyro and the azimuth gyro loops. A voltage threshold detector determines whether the signal from the north sensor requires low or high rate azimuth torquing. If high rate azimuth torquing is required in the azimuth gyro loop, the east gyro loop is either locked or torqued at a high rate.

10 Claims, 9 Drawing Figures derived by the bubble north sensor. 
SELF CONTAINED QUICK REACTING WIDE ANGLE GYROCOMPASSING This invention is related to navigation systems or heading reference systems which may be utilized in land, air and sea vehicles. More particularly, this invention relates to a fast reacting, self-contained wide angle gyrocompassing system.

BACKGROUND OF THE INVENTION

Conventionally, a heading reference unit may consist of a two axis two degree of freedom or two gimballed platform supported by platform and gyrocompassing electronics. The platform is gimballed about a two axis gyro which works in conjunction with bubble level sensors or accelerometers, in order to maintain the east gyro in a true east-west direction and the azimuth gyro in a true north direction. The platform is also associated with means to read the heading of the vehicle in which the heading reference unit is situated. The inner gimbal of the platform is designed to rotate about east and also houses the gyro and the sensors. The outer gimbal is designed to rotate in azimuth. Direct drive dc torquers are provided on each gimbal plus a synchro on the azimuth axis for heading readout. These components work together to solve the gyrocompassing problem. In addition, external "Best Available True Heading" (BATH) is required to work with the components mentioned in order to achieve a fast reaction time. That is, the BATH reference is needed to gyrocompass from the large initial angles within a short period of time.

The heading reference systems employing an external azimuth reference or BATH is required to achieve fast reaction times. However, BATH hardware usually consists of a magnetic compass which has the undesirable characteristics of being offset by magnetic variations that have to be approximated and manually preset into the heading reference unit. This manual operation results in an additional undesirable factor of human error. Another disadvantage of systems employing BATH reference is that in order to achieve ten minutes reaction time, complicated schemes have to be implemented which requires additional expense. Moreover, such schemes require an optimized thermal behavior of the platform and component sensors which exhibit low drift, excellent repeatability and high accuracy behavior. All of which features involve expense as well as longer reaction times.

The heading reference system of the present invention is self-contained and overcomes the aforementioned disadvantages by not relying on an external azimuth reference or BATH. However, the present invention is capable of initializing within the same time period as BATH. Thus, the present invention has the advantages of cost savings in the elimination of BATH and its associated hardware, the elimination of human error since magnetic variations do not have to be manually preset, the elimination of the requirement to define the magnetic variations from north maps or external sources, and the relaxation of platform thermal reaction requirements as well as component accuracy requirements. In addition, the present invention has the advantages of higher degree of confidence since the heading reference unit torques to its final value and since gyrocompassing is accomplished to the final value, accuracy is increased.

BRIEF DESCRIPTION OF THE INVENTION

The present invention provides wide angle gyrocompassing in a ten to fifteen minute time span without the need of an external azimuth reference. The present invention also provides a means of controlling one axis of a two axis platform while the other axis is torqued at a very high rate. In the present invention the output from a bubble north sensor is applied to a switch means which provides coarse align and gyrocompass mode functions. In the coarse align mode the north sensor output along with an initial vertical error signal is applied to an east high torquer which coarsely aligns the east gimbal in the east-west direction. After this operation the switch means is automatically stepped to the gyrocompass mode and the signal from the north sensor is simultaneously applied to the east gyro and the azimuth gyro loops. A threshold voltage detector detects the magnitude of the signal from the north sensor. If the signal is within a predetermined limit, low rate azimuth torquing is accomplished. However, where the signal from the north sensor exceeds the predetermined limit, high rate azimuth torquing is accomplished in the azimuth gyro loop while the east gyro loop is either locked or torqued at a high rate.

Accordingly, it is an object of this invention to provide a heading reference system where wide angle gyrocompassing is achieved in a short time frame without the need of an external azimuth reference.

Another object of the invention is to provide a heading reference system wherein one axis of a two axis platform is essentially locked while the other axis is torqued at a very high rate.

It is another object of the invention to provide a heading reference system wherein the gyrocompassing period is increased.

It is yet another object of this invention to provide a heading reference system that is less expensive since complicated external azimuth reference hardware is not required.

Further objects, advantages and features of the invention will be apparent from the following description and the accompanying drawings wherein.

Figure 1:
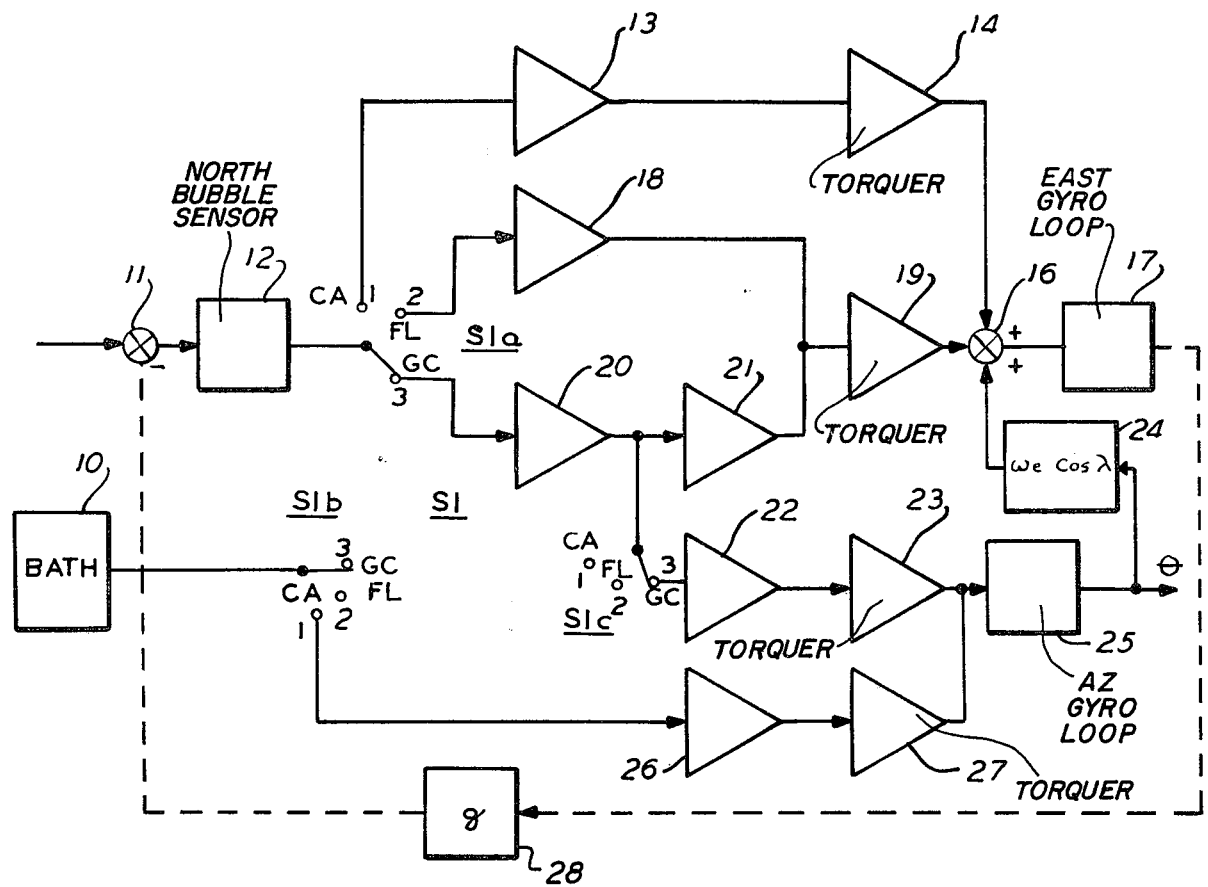
FIG. 1 is a block diagram showing a prior art heading reference system employing external azimuth reference or BATH.
Figure 1A:
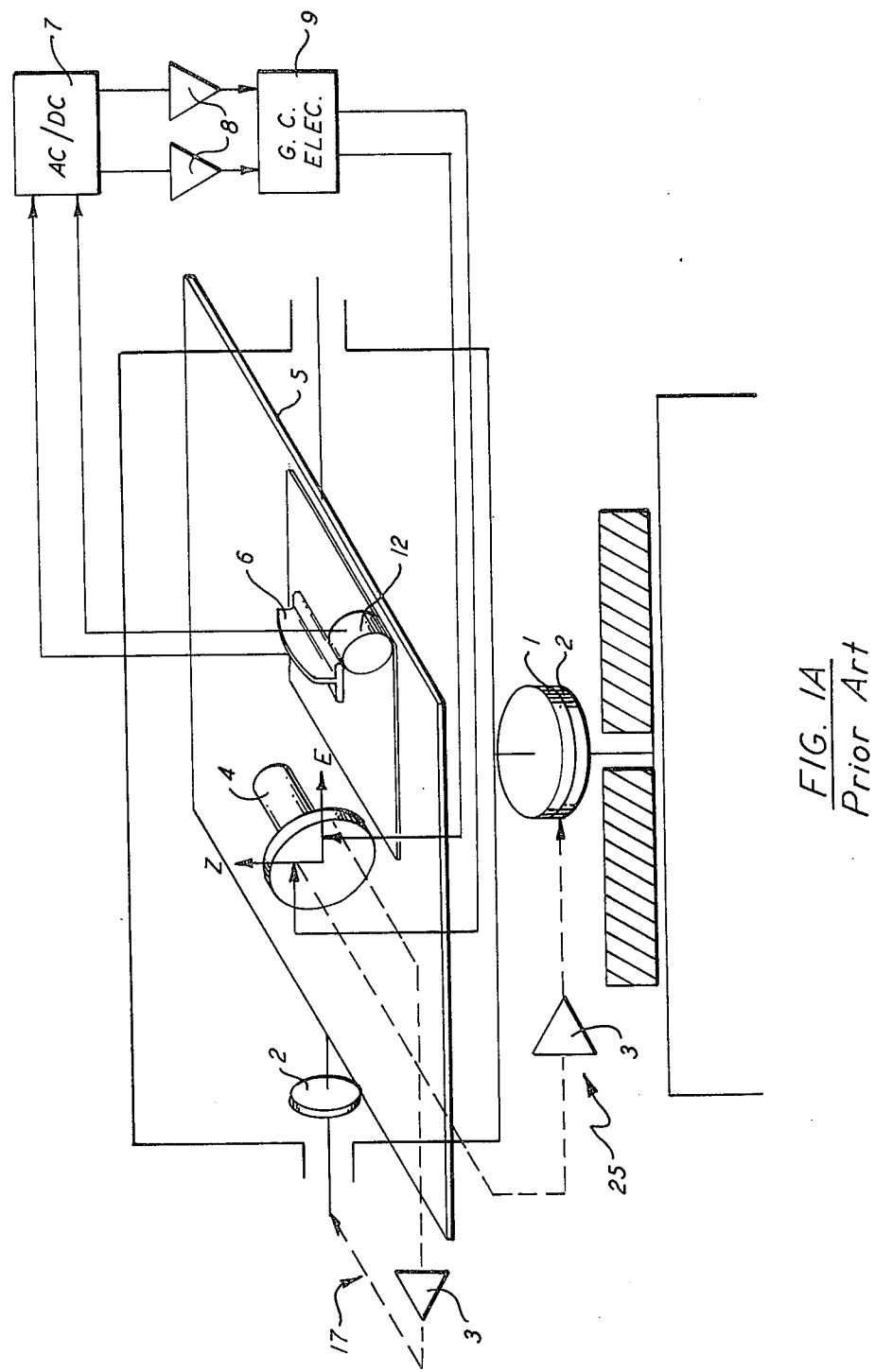
FIG. 1a is a perspective block diagram illustrating a conventional heading reference unit.
Figure 5:
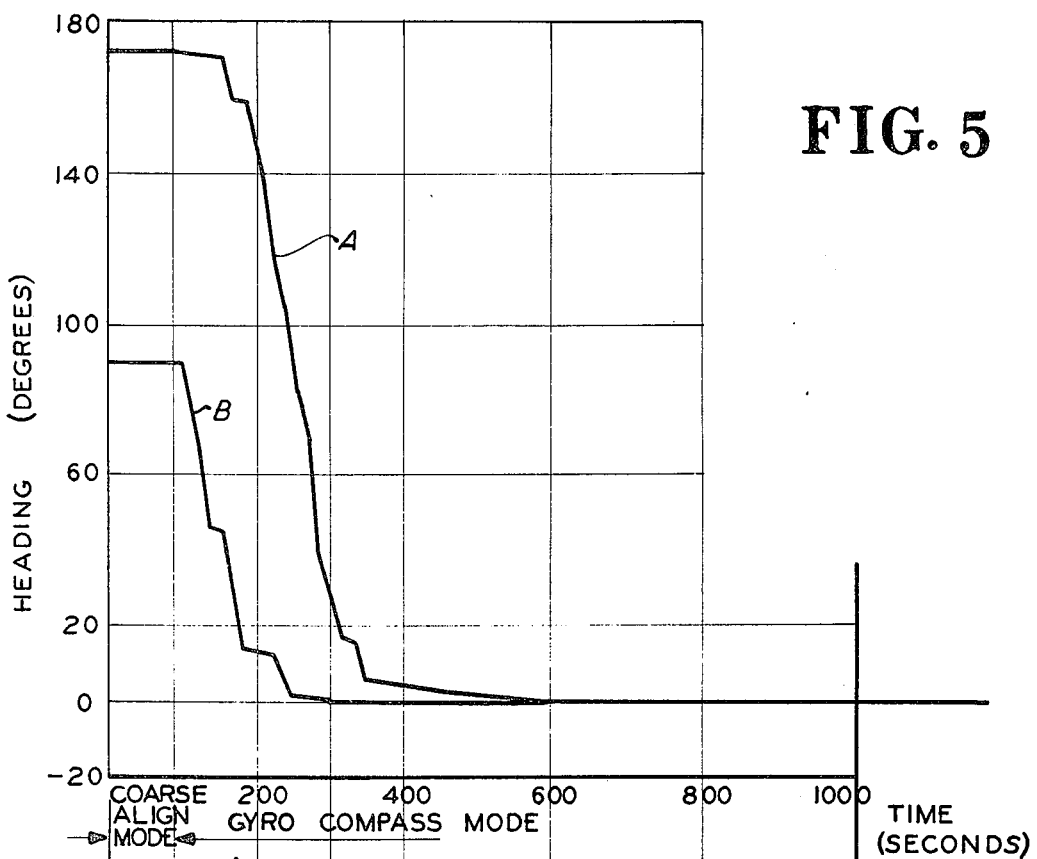
Figure 6:
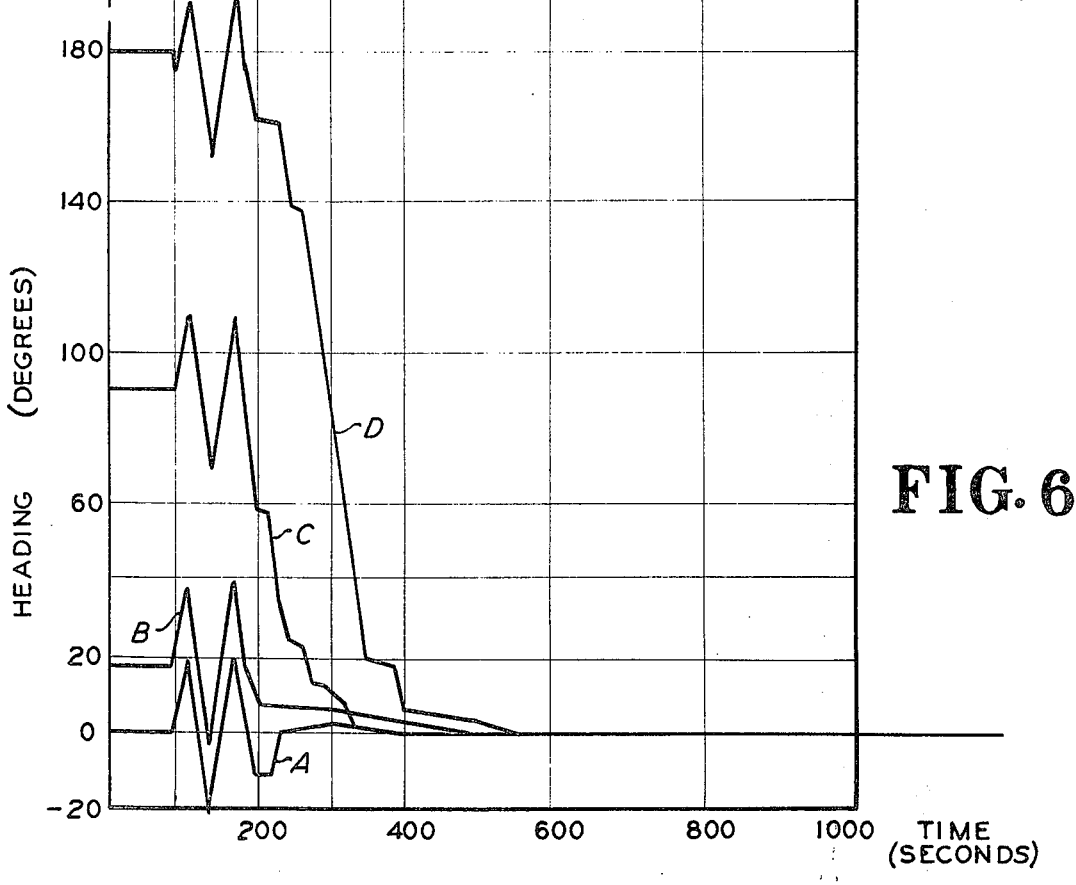

FIG. 5 is a graph in which the curves show gyrocompassing to north in 600 seconds, employing only coarse align and gyrocompassing mode; and FIG. 6 is a graph similar to FIG. 5 in which the east gimbal is initially misaligned by 1.8° upon entering the gyrocompassing mode FIG. 1a is a functional block diagram partially in schematic form illustrating the basic heading reference unit of the prior art and the general type of heading reference with which the present invention deals. As noted above it includes a platform supported for rotation about two axes. The platform 5 is supported for rotation about an east axis and about a azimuth or Z-axis. These two axes are indicated in associated with a gyro 4 which is mounted to the platform 5. The gyro 4 has its spin axis directed in a direction mutually perpendicular to the Z- and E-axes, and thus can be torqued about these two axes. Also mounted on the platform is a north bubble sensor 12 and an east bubble sensor 6. These are conventional items in which a liquid is used to measure acceleration along the north and east axis respectively. Their outputs which are in an AC form are provided to an AC/DC converter 7, the outputs of which are then provided through amplifiers 8 to gyrocompass electronics 9. In the gyrocompass electronics 9, torquing signals are developed for torquing the gyro 4 about the Z- and E-axes. The gyros also provides pick-off outputs to amplifiers 3 contained in an east gyro loop 17 and an azimuth gyro loop 25 respectively. Each of the gyro loops also includes a torquer motor for torquing the platform about that axis. Associated with the azimuth axis is also a synchro pick-off unit 1 for providing an output indicative of heading. In general, it is desired that the synchro axis be pointing toward the north with the gyro east axis pointing exactly east and the Z-axis pointing up. As is well known by those skilled in the art, once the gyro is brought up to speed, the gyro spin axis will remain fixed inertially in space unless the gyro is torqued. As will be more fully explained below, if the platform is not level an output from the bubble sensor 12 will be provided to result in torquing, for example, about the east axis to level the platform. As the gyro is torqued, the gyro moves with respect to the gyro case on the platform developing an output signal which is provided to the loop 17 to drive its torquer 2 to adjust the tilt of the platform. This again is a conventional type loop. In general terms, such torquing of the gyro and the use of its output signals through a quick acting gyro loop will continue until the platform is level. Because of the fact that gyros remain fixed in inertial space gyros are affected by the rotation of the earth. Consider a gimble which was supported for freedom in all three axis, i.e., was also rotatable about north in addition to being rotatable about east and azimuth. The platform would tend to remain fixed inertially with space and after a while because of the earth's rotation would no longer be level about the north axis. In other words, if the platform 5 of FIG. 1a also mounted so as to be rotatable about a north axis and it was maintained fixed in inertial space it would eventually tilt so that the E-axis would point downward. The same thing occurs in the present arrangement if the east axis is not lined up with east. In other words, the platform is no longer rotatable about the east axis but is rotatable about some axis lying somewhere between north and east. As a result, earth's rate will cause a tilt which will picked up by a north sensor. Note that when the axes are properly lined up with the east axis pointing east, the north bubble sensor will be insensitive to any tilt of the platform about a north axis. But, if the east axis is rotated there will be a component of tilt sensed by the north sensor. The amount of tilt caused by rotation of the earth, is, as is well known, a function of latitude and in effect is generally termed as $\omega_e \cos \lambda$ where $\omega_e$ is the earth's rotation and $\lambda$ is the latitude. Its effect on the tilt about east with an azimuth $\theta$ different from north is thus $\omega_e \cos \omega \sin \theta$. This fact is made use of in gyrocompassing. If the north bubble sensor, with the platform once leveled still experiences an output indicating a tilt, this means that the east axis is not pointing east, i.e., it is being affected by earth's rate. It is possible then to use this signal to torque the gyro about the Z-axis. This in turn causes an output through the loop 25 to torque the torquer 2 in that loop to rotate the platform until perfect alignment is obtained. A typical prior art circuit for initially aligning the gryocompass system will now be explained with reference to FIG. 1.

Referring now to FIG. 1, a north bubble sensor output 12 is applied to a mode selector switch S1. This switch is a three position ganged switch having sections S1a, S1b and S1c. When S1 is switched to the coarse align mode, position 1 of S1, a signal representative of the deviation of the platform from level is fed to east high rate amplifier 13 which in turn applies a signal to the high rate torquer 14. The output from the high rate torquer is applied to summing point 16 and thence to east gyro 17. Hereinafter, when referring to the east gyro 17 or the azimuth gyro 25 what is meant is the entire loop described above in connection with FIG. 1a, i.e., this includes the gyro and the cyro loops for torquing the platform. As explained above, this torquing of the east gyro and the attendant torquing of the platform associated herewith will have an effect on the bubble sensor 12. This is indicated on the drawing by showing a dotted line output from the gyro 17 through a gravity block 28 back to the bubble sensor. The dotted lines indicated a mechanical or kinematic connection between these two elements and not a direct electrical connection. The reason block 28, the gravity block, is shown is that the bubble sensor output will of course be determined by the tilt, as controlled by the east gyro, and gravity. The output from block 28 is applied to summing point 11 and from summing point 11 to the input of north sensor 12. Note all of the dotted lines are a kinematic or mechanical coupling. At the same time that a north sensor signal is applied to the east high torquer loop an azimuth reference signal or BATH 10 is applied through section S1b of S1 to azimuth amplifier 26 which in turn applies a signal to azimuth high rate torquer 27. The output from azimuth high rate torquer is fed to azimuth gyro 25. Also shown in the FIGURE is a kinematic or mechanical connection between the gyro loop 25 and the east gyro. This functional block is labelled $\omega_e \cos \lambda$ and in functional terms multiplies the sine of $\theta$, i.e., the azimuth by this term to add a further rotation to the platform. As noted above, if everything is aligned, sine $\theta$ will be zero and this tilting of the platform due to the earth's rate will have no effect on the north bubble sensor. However, if $\theta$ is anything but zero there will be a tilting effect on the platform which will be felt and corrected. This effect is shown as being summed at the summing junction 17 at the input to the east gyro 17. The coarse align mode position of switch S1 is a 90 seconds mode in which the east gimbal is crudely levelled using the north sensor and in which azimuth is aligned using the BATH to within ± 7° of true north.

When mode switch S1 is switched to the fine level mode, position 2, the output from the bubble sensor is applied to the amplifier 18 associated with the east low rate torquer 19. The output from east low rate torquer is applied to east gyro 17 via summing network 16. In this position of S1 no input is applied to any of the azimuth gyro loops. The fine level mode is a 5 minute mode and in this mode the east gimbal is precisely levelled in a second order mode. At the end of 5 minutes duration the east gimbal position, as measured by the north sensor, is tilted, as a function of $\omega_e \cos \lambda \sin \theta$, the earth's angular rate. In other words once a level has been reached it would normally be maintained. However, because of the earth's rate and the fact that azimuth is not zero, the aforementioned term will have an effect.

When mode switch S1 is switched to the gyrocompass mode, position 3 of S1, the output from the bubble sensor is applied to pre-amplifier 20. From pre-amplifier 20 the signal is applied to amplifier 21 for later application to east low rate torquer 19 and summing network 16. The same signal from pre-amplifier 21 is applied to S1c of S1 and thence to amplifier 22 prior to application to azimuth low rate torquer 23. The output from low rate azimuth torquer 23 is applied to azimuth gyro 25. The output from gyro 25 is mechanically coupled to earth rate circuit 24 and is combined at summing network 16 with the output from the east low rate torquer for application to east rate gyro 17. The gyrocompass mode is a 3.5 minute or 210 seconds mode in which the third order loop reacts like a second order loop with damping of 0.7. The loop dynamics are set such that zero cross-over (or north) occurs during the first quarter of a damped oscillatory loop at 3.5 minutes after entering the gyrocompass mode. This cross over is normally independent of initial azimuth angles from north. However, electronic saturation prohibits cross-over at 3.5 minutes for angles beyond $\pm 7°$ from north. Because BATH has aligned the azimuth angle to within $\pm 7°$ north, the gyrocompass mode is a precisely timed 3.5 minute mode in which precession ceases when zero cross-over or north occurs. North reference is therefore, achieved.

Figure 2:
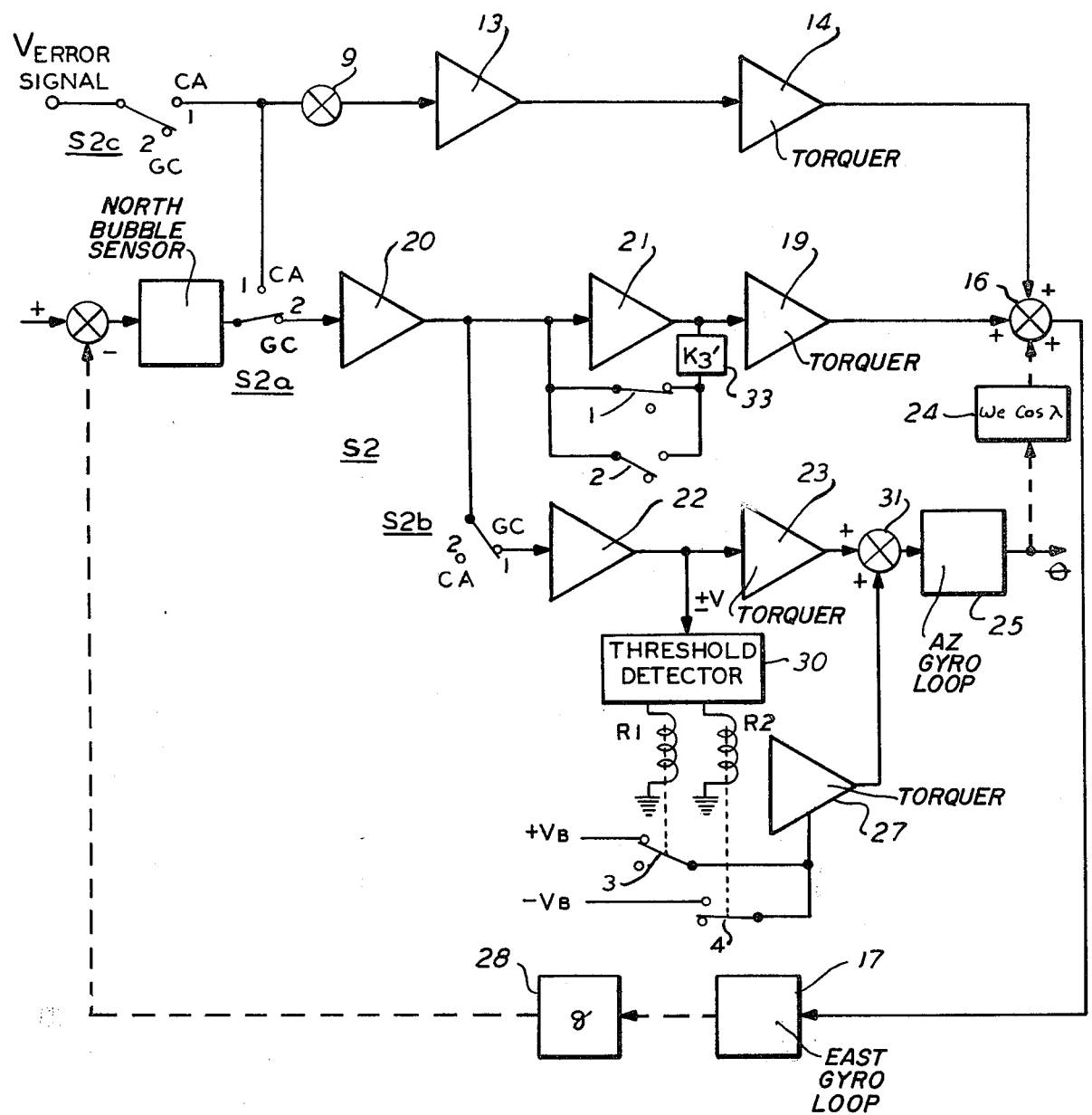
FIG. 2 is a block diagram showing the east gyro and azimuth loops of the invention in which the external azimuth reference is eliminated.

Turning now to FIG. 2, there is shown the improved heading reference or gyrocompassing system of the invention. It should be noted that the reference numerals are the same in the block diagram of FIG. 2 where the same blocks perform the same function as described with regard to FIG. 1. In FIG. 2, a signal representative of the platform tilt is derived from north sensor 12 and is applied to mode selector switch S2. Mode selector switch S2 is a ganged switch comprising three sections S2a, S2b and S2c and selects two positions, namely coarse align mode and gyrocompass mode. When S2 is switched to the coarse align mode, position 1 of S2, section S2a applies the signal from the north sensor to the east high rate torquer loop. Also in this position section S2c applies an error signal to summing point 9 where it is combined with the signal from the north sensor 12. This error signal is employed to prevent nulling at south and will be explained in greater detail below. In position 1 of S2 no signal is applied to the azimuth loops. The combined signals from S2a and S2c are first applied to amplifier 13 where they are amplified and then applied to east high rate torquer 14. The output from east high rate torquer is then applied to summing point 16 and from there to east rate gyro 17. As described below there is a mechanical connection through gravity block 28 and thence to summing point 11 and then to the input of north sensor 12. This position of the mode switch is a 90 seconds mode similar to the function as described with regard to FIG. 1. In this mode the east gimbal is crudely levelled using the north sensor.

When switch S2 is switched to position 2, the gyrocompass mode, the output from the north sensor is applied through S2a to the east low rate loop and through S2a and S2b to the azimuth gyro loops. Specifically, signal from the north sensor is applied to amplifier block 20 and is sent to amplifier 21 and east low rate torquer 19 and thence to summing point 16. The same signal is also applied to amplifier 22 of the azimuth gyro loop. Depending on the magnitude of the voltage detected at threshold voltage detector 30 an output is obtained from the azimuth low rate torquer 23 or the azimuth high rate torquer 27 for input to the azimuth gyro 25 from summing point 31. The output from the azimuth gyro 25 is, as described above mechanically coupled to earth rate block 24. At summing point 16 the outputs from blocks 19 and 24 are summed and applied to east gyro 17.

As seen in FIG. 2, the threshold detector 30 monitors the voltage applied to the azimuth low rate torquer 23. Threshold detector 30 is designed to detect whether the initial angle from north is greater than $\pm 7°$ when going into the gyrocompassing mode. As previously stated, the north sensor is the basic mechanism for gyrocompassing. With the platform level, the output of the north sensor 12 is proportional to $\omega_e \cos \lambda \sin \theta$ where $\omega_e$ is earth rate, $\lambda$ is latitude and $\theta$ is the angle from north. The output from the north sensor is scaled by amplifiers 20 and 22 therefore the signal presented to the threshold detector is a measure of $\theta$. The threshold detector is scaled at $\pm V$ volts which corresponds to $\theta$ angles greater than $\pm 7°$. If the initial azimuth angle in the gyrocompass mode is greater than $\pm 7°$, the threshold voltage $\pm V$ is exceeded and either relay R1 or R2 is energized placing a $+V_B$ or a $-V_B$ on the azimuth high rate torquer 27. Relay R1 may be dedicated to a positive wide angle and relay R2 may be dedicated to a negative wide angle. Both azimuth torquers 23 and 27 are therefore active, torquing the azimuth gyro 25.

As noted the azimuth displacement angle $\theta$ feeds the east gyro kinematically. In this manner, the azimuth gimbal is torqued toward north reducing the azimuth displacement angle $\theta$ until the voltage at the input of threshold detector 30 is reduced below the threshold value $\pm V$ and normal azimuth torquing to north is restored. This is a convenient means of torquing the azimuth gimbal from initial heading angles greater than $\pm 7°$ at a very fast rate. The rate at which the azimuth gimbal can be torqued is, however, restricted due to the east gimbal and north sensor reaction to the azimuth high torquing rate.

The east gimbal loop, through the contacts 1 and 2 of relay R1 and R2 in the feedback circuit of amplifier 21 is required to be altered in order to restrict east gimbal motion while the fast azimuth torquing is taking place. Essentially, the east gimbal is locked by the contacts of relays R1 and R2 when azimuth high rate torquing is taking place.

Threshold voltages of $\pm 3.5$ VDC and azimuth high rate torquing voltages of $\pm 15$ VDC may be employed to achieve fast gyrocompassing. Where the precession rate in the azimuth high rate torquing mode was 3900°/hr., the east gimbal loop was increased by a factor of seven. The present invention provides a ten minute reaction time from azimuth angles up to $\pm 170°$ from north and fifteen minutes reaction times for azimuth angles from $\pm 170°$ to $\pm 180°$ from north. Accuracy is dependent upon the quality of the gyro used.

Figure 3A:
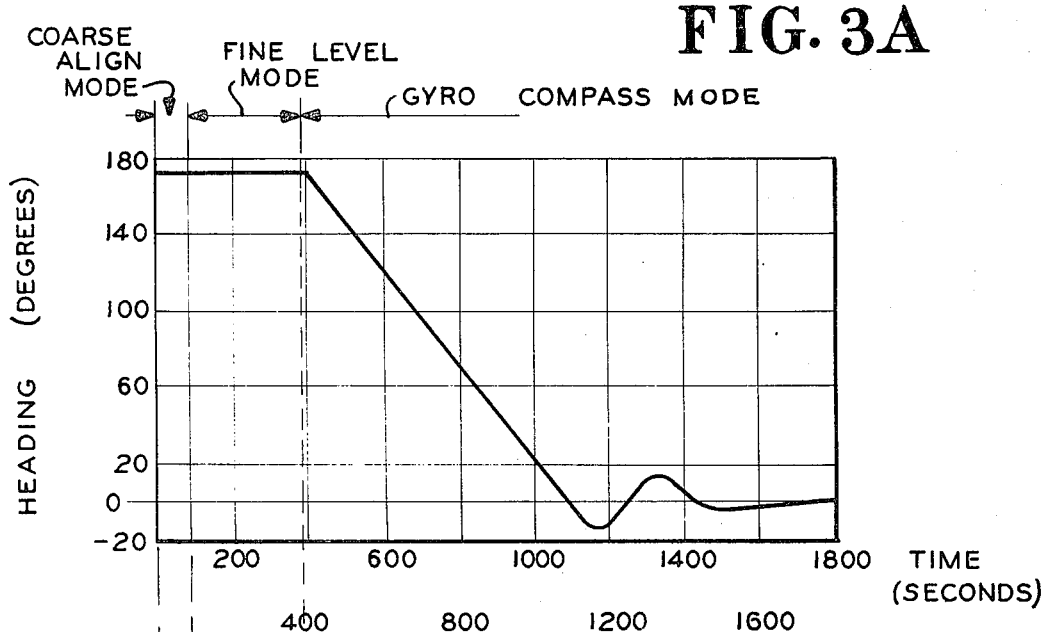
FIG. 3A is a graph of azimuth vs. time.
Figure 3B:
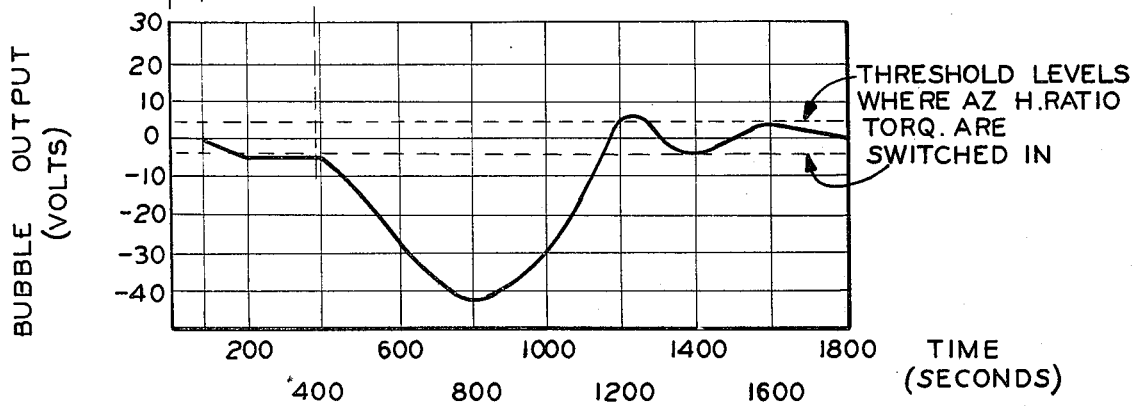
FIG. 3B is a graph of the bubble sensor output vs. time.

FIGS. 3a and 3b illustrated simulated operation of gyrocompasing according to the present invention in a system in which both a course align mode and fine leveling mode are used prior to the gyrocompassing mode and in which the east gimbol lube is not locked. These figures form a basis for comparison with figures to be discussed later which illustrate the system of FIG. 2. The system being illustrated on FIGS. 3a and 3b is one which would be the same as of FIG. 2 except that it would include an additional fine leveling loop such as in FIG. 1 and would not have the increase gain to tighten up the east gyro loop.

FIG. 3A plots azimuth vs. time and is the simulation results of the wide angle gyrocompassing. The scheme monitors the north sensor output measured at the azimuth low rate torquer when in the gyrocompass mode. When the voltage at the torquer exceeds ± 3.5 VDC (Corresponding to azimuth heading output greater than ± 7°) zener diodes in the threshold detector allow switching the azimuth high rate torquer with a fixed voltage into the loop.

FIG. 3B plots north bubble output vs. time. The coarse align mode (90 sec.) fine level mode (5 min.) and gyrocompass mode durations are shown on plots FIGS. 3A and 3B and defines the action of the azimuth gimbal and north bubble sensor in each of the modes. In the coarse align mode azimuth has an initial heading of 172° away from north while the north bubble reads zero (east gimbal level). In the fine level mode azimuth gimbal is not torqued and is maintained at 172° while the second order erection loop of the east gimbal is initialized. Note the bubble output response in the fine level mode and also note that at the end of the fine level mode the bubble output at the azimuth low rate torquer is greater than −3.5 VDC indicating that the azimuth high rate torquer will be kicked in as soon as the gyrocompass mode is entered. When entering the gyrocompass mode both azimuth torquers are initialized as described above. The east gimbal bubble output increases as the azimuth gimbal goes from 172° to 90° (as it should since maximum Earth's rate is 90°). The east gimbal reaches a peak at 90° and decreases as the azimuth gimbal is torqued from 90° to north. FIG. 3B shows the north bubble output and how it controls the azimuth torquing rates until the bubble output dampens out to zero and a north reference is achieved. In this scheme, the maximum rate that the azimuth gimbal can be torqued is approximately 900°/hr. The restriction is due to the east gimbal and bubble sensor reaction when torquing azimuth too fast creating oscillator conditions. This scheme achieves a north reference in approximately 30 minutes. The limiting factor, as described above, in achieving a north reference at a faster rate is primarily due to the east gimbal/bubble output reaction when torquing the azimuth gimbal at a fast rate.

Figure 4A:
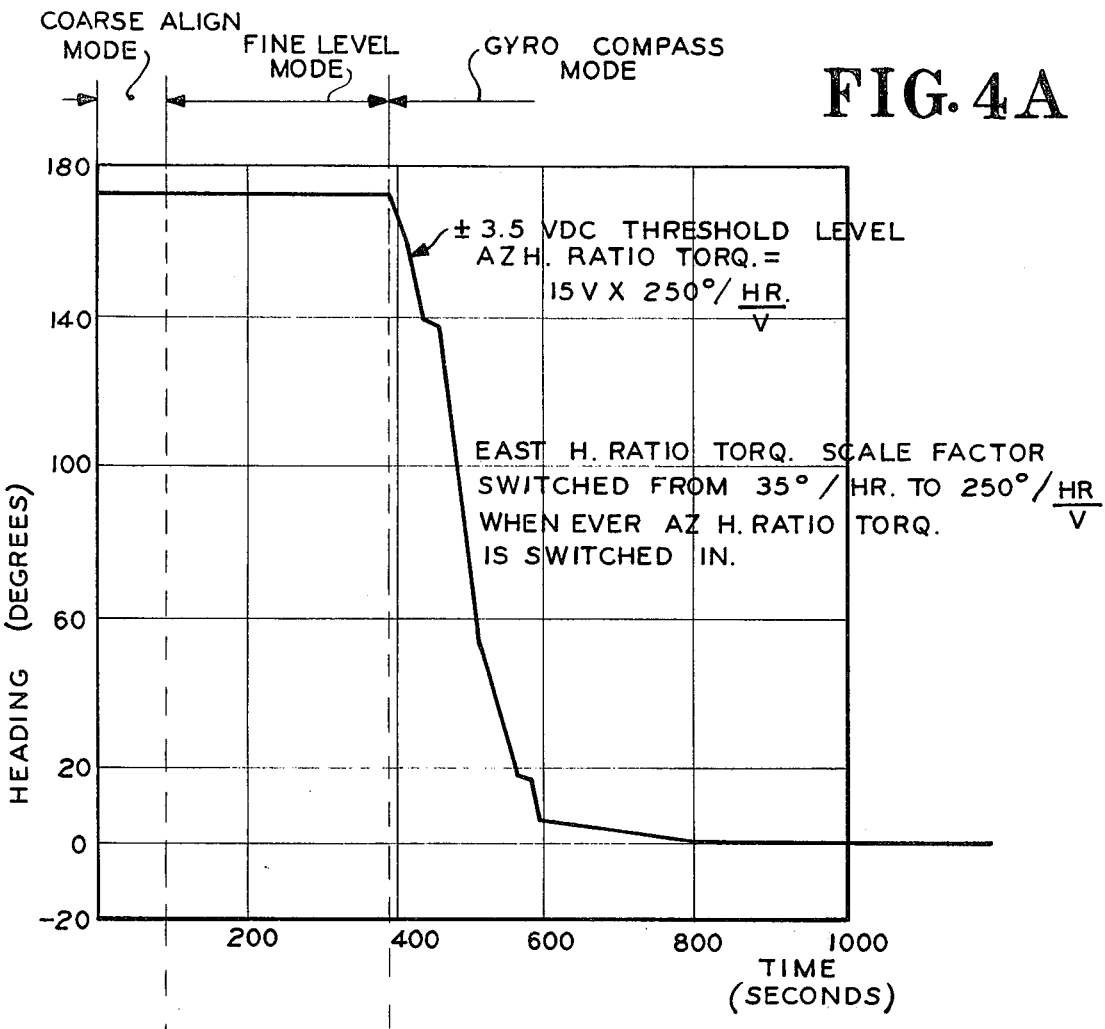
FIG. 4A is a graph similar to FIG. 3A in which gyrocompassing to north is achieved in 800 seconds.
Figure 4B:
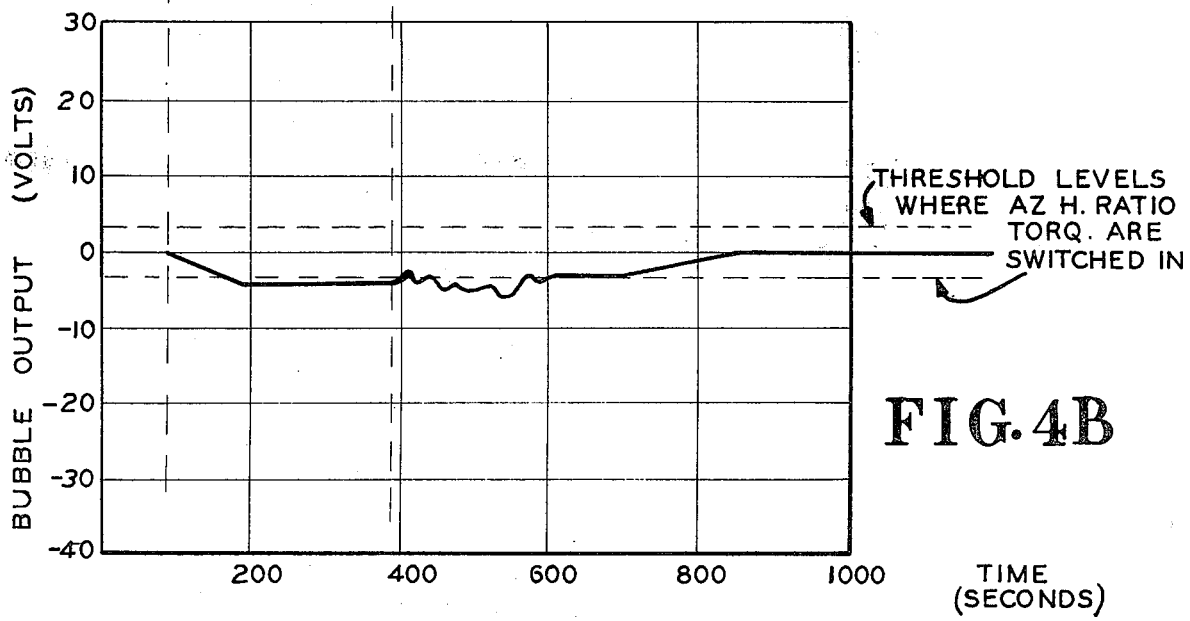
FIG. 4B is a graph similar to FIG. 3B showing bubble sensor output vs. time.

FIGS. 4a and 4b are similar plots for a system like that of FIGS. 3a and 3b but having the means shown on FIG. 2 for increasing the scale factor of the each gryro lube. In other words, it is for a system like that of FIG. 2 except that the system is in addition course align mode and gyro compass mode also has a fine level mode.

FIGS. 4A and 4B plot a gyrocompassing scheme in which north was achieved in 800 seconds by controlling the east gimbal and bubble output and allowing the azimuth gimbal to be torqued at its maximum value (3900°/hr.). The results were very simply achieved by raising the east torquer scale factor (from 35°/hr. to 250°/hr.), whenever the azimuth high rate torques were switched in. The east loop was made a great deal tighter prohibiting any real motion of the east gimbal while the azimuth axis is torqued at a very high rate. When the azimuth high rate torquers are switched out, normal gyrocompassing loop constants are restored and since no violent motion of the east gimbal was made the system calmly torques to north with a minimum of effort.

Two possibilities for controlling the east axis are possible, the first is a simple gain change of the east loop restricting motion of the gimbal close to the threshold level, or second, the gain of the east loop is made excessively high, as shown in the simulation, where an oscillation or bang-bang condition for the east axis exists when the azimuth high rate torquing is required. The operation is explained below:

1. When azimuth high rate torquers are switched in, the east loop gain is changed to a high value.
2. The east loop change creates a very tight loop causing the east axis to torque towards null.
3. When the east axis goes towards null and the bubble sensor indicates less than ± 3.5 VDC, the azimuth high rate torquers are switched out and normal gyrocompassing loop gains are retained.
4. The normal east loop gain causes the east axis to torque back away towards null, beyond the ± 3.5 VDC threshold level.
5. The azimuth high rate torquers are switched back in along with the east high loop gain.
6. The above conditions keep repeating until the system is close to north when high rate switching will not become operationable.

Essentially, the east gimbal is locked to the threshold level while wide angle gyrocompassing is being performed, and, released when the system is near north.

FIGS. 5 and 6 illustrate operation in the system such as that of FIG. 2 in which the fine leveling mode is eliminated. In FIG. 5 the azimuth gimbals are initially at 172° (curve A) and 90° (curve B) and upon entering the gyrocompassing mode the east axis is level and the bubble sensor reading zero. From the plot of FIG. 5, the initial azimuth torquing rates are very small upon entering the gyrocompassing mode, until the bubble level sensor builds up to the saturation level at which time wide angle gyrocompassing begins. Note, gyrocompassing accuracy is achieved well below the 600 seconds mark.

FIG. 6 is the same simulation as FIG. 5, however, the east axis was misaligned by 1.8° upon entering the gyrocompassing mode. Four plots, (curves A,B,C, and D) with initial heading angles from 0°, 17° 90° and 180° respectively are shown. Because of the gimbal misalignment, in each case the azimuth gimbal was torqued initially in the wrong direction, however, the system corrected itself and within 10 minutes gyrocompassing accuracy was achieved.

Azimuth alignment is based on the fact that, if the platform is held level, it must rotate in space at the earth rate. Thus, if the platform is level and at an azimuth angle from north defined by $\theta$, the precession rate about the east axis must be $\omega_e \cos \lambda \sin \theta$, where $\omega_e$ is earth's rate and $\lambda$ is latitude. If the precession rate, driven by the north sensor, is used to torque the azimuth axis, the system will reach equilibrium only when $\omega_e \cos \lambda \sin \theta$ vanishes. When $\theta = 0$, the azimuth and east precession rates vanish, and the north sensor is level and pointing north.

Examination of the $\omega_e \cos \lambda \sin \theta$ term reveals the north sensor has its maximum values at $\theta = 90°$ and 270°, (azimuth angles east and west); and will have no output (zero volts) when $\theta = 0$ and 180° (azimuth angles north and south). Therefore, if the system has an initial azimuth angle of 180° (or is pointing south, gyrocompassing to north cannot be accomplished since no output from the north sensor is available.

The invention gyrocompasses from any initial azimuth angle (including south) within the same reaction time as prior art devices. During the initial 90 seconds of the gyrocompassing initialization process, the inner gimbal (east gimbal) of the Heading Reference Unit (HRU) platform is levelled. After the 90 seconds coarse align mode, the HRU enters the gyrocompass mode and the azimuth gimbal of the HRU is physically torqued to north. During the coarse align mode, a bias error signal from the north sensor is electronically implemented within the levelling loop. This will create a false east gimbal level position thereby generating a signal out of the north sensor other than its normal value. When the gyrocompass mode is entered, the bias error signal is removed, however, the north sensor, which is used as a basic tool for torquing the HRU azimuth gimbal to north, still has a signal other than its true signal. The azimuth gimbal is consequentally set in motion as soon as the gyrocompass mode is entered regardless of initial azimuth position. FIG. 6 shows a plot of four gyrocompassing runs with initial azimuth position ranging from 0° (true north) up to 180° (south). Note in all cases, when the gyrocompass mode is entered, the north sensor bias error signal has the affect to torquing the azimuth gimbal in the wrong direction. However, after oscillating about its initial azimuth position, the north sensor corrects itself and the proper azimuth direction is found. This operation is a repeatable (as shown in FIG. 6) and allows gyrocompassing from any initial azimuth angle including from 180°or south.

From the foregoing discussion wide angle gyrocompassing to within 10 minutes without BATH has been demonstrated. It has also been demonstrated that accuracy is better since the system gyrocompases through to its final value not relying on prior gyrocompassing restraints. Further, the invention makes bubble reading not critical initially but only critical at the end of the gyro compass run. This permits the thermal reaction requirements to be extended not placing the burden on the position of the north sensor for torquing when entering the gyrocompass mode and not relying on a precise tilt sensor output which greatly affects azimuth axis dynamic response. Finally, it has been demonstrated that component electronic tolerances can be relaxed and cost savings are realized by eliminating BATH mechanization equipment and the third bubble level sensor.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. In a fast reacting wide angle self-contained gyrocompassing system having an east gyro loop, an azimuth gyro loop and a north sensor means, a means for detecting the output of said sensor means requiring high rate torquing comprising:

a mode selector switch comprising a coarse align position and a gyrocompassing position, means for detecting a threshold voltage signal from said sensor means while said switch means is in said gyrocompassing position; and means for alternately applying signals to said east gyro loop and said azimuth gyro loop whereby said sensor means is rapidly brought to a null condition.

2. The gyrocompassing system of claim 1 comprising:

an error signal applied to said east gyro loop when said mode selector switch is in said coarse align position for preventing said azimuth gyro from nulling in a southerly direction whereby said azimuth gyro is capable of gyrocompassing from any initial azimuth position.

3. The gyrocompassing system of claim 2 comprising:

an east low rate torquer in said east gyro loop, an azimuth low rate torquer in said azimuth gyro loop, an azimuth high rate torquer in said azimuth gyro loop, a first polarity source of voltage for application to said azimuth high rate torquer, a second polarity source of voltage for application to said azimuth high rate torquer, means for selecting in said selector said first polarity source of voltage when gyrocompassing from a positive angle from north and means for selecting said second polarity source of voltage when gyrocompassing from a negative angle from north and means for applying said sources of voltage to said azimuth high rate torquer whereby said sensor means is rapidly brought to null concondition.

4. The gyrocompassing system of claim 3 comprising means operable upon said detector for controlling the gain in said east gyro loop.

5. In a gyrocompassing system including a platform having mounted thereon a gyro which can be torqued about an east axis and an azimuth axis, said platform being supported for rotation about said east and azimuth axes said system including an east gyro loop and azimuth gyro loop for torquing said platform about said axes in response to outputs from said gyro and including north sensing means for detecting acceleration along the north axis and means responsive thereto for gyrocompassing said platform for torquing said gyro to level said platform, improved means for leveling and gyrocompassing comprising:

a. first means coupled to the sensor output for torquing the gyro about the east axis to level the platform;

b. means for detecting coupled to the sensor output providing a first output if its input is below a predetermined level and a second output if its input is above a predetermined level;

c. first azimuth torquing means responsive to said first output to torque said gyro about the azimuth axis at a low rate; and d. second azimuth torquing means responsive to said second output to torque said gyro about said azimuth axis at a high rate.

6. Apparatus according to claim 5 and further including means responsive to said second output to increase the gain of said means for torquing said gyro about said east axis.

7. Apparatus according to claim 5 and further including second, coarse leveling means for torquing said gyro about said east axis and including means for selectively coupling said sensor to said second coarse leveling means and to said first means for torquing about said east axis and means for detecting.

8. Apparatus according to claim 7 and further including means for adding an error signal to said second coarse leveling means to prevent nulling in a southerly direction.

9. Apparatus according to claim 7 wherein said means for selectively coupling comprise a mode selector switch having a coarse align position during which the output of said sensing means is coupled to said second coarse leveling means and a second, gyrocompass position in which said sensing means is coupled to said first means for torquing and said means for detecting and wherein said means adding an error signal comprise an error signal source and an additional contact of said switch for coupling said error signal source to said second, coarse leveling means when said switch is in said coarse align position.

10. Apparatus according to claim 9 wherein said means for detecting comprises a threshold voltage detecter for detecting when the output of said sensing means exceeds a predetermined threshold voltage.

* * * * *